United States Patent [19]

Sadowski et al.

[11] Patent Number: 4,830,041
[45] Date of Patent: May 16, 1989

[54] REELABLE FLOW STOPPER FOR PLUGGING FLUID FLOW WITHIN A PIPE

[75] Inventors: Dennis L. Sadowski, Encino, Calif.; Narayan C. Saha, Lake Villa, Ill.

[73] Assignee: Institute of Gas Technology, Chicago, Ill.

[21] Appl. No.: 260,493

[22] Filed: Oct. 21, 1988

[51] Int. Cl.⁴ .................. F16K 5/10; F16K 13/00
[52] U.S. Cl. .................... 137/246; 137/317; 251/205; 251/294; 251/901
[58] Field of Search ............... 137/246, 317; 251/205, 251/294, 901, 902

[56] References Cited

U.S. PATENT DOCUMENTS

| | | | |
|---|---|---|---|
| 3,334,656 | 8/1967 | Boyle | 251/901 X |
| 3,973,631 | 8/1976 | Hefetz | 251/902 X |
| 3,990,464 | 11/1976 | Jenkins | 251/901 X |
| 4,295,494 | 10/1981 | McGowan et al. | 138/89 |
| 4,401,260 | 8/1983 | Grant | 251/294 X |
| 4,438,781 | 3/1984 | Brenholt | 251/901 X |
| 4,441,561 | 4/1984 | Garmong | 138/89 X |
| 4,458,721 | 7/1984 | Yie et al. | 137/318 X |
| 4,554,973 | 11/1985 | Shonrock et al. | 166/192 |
| 4,607,469 | 8/1986 | Harrison | 138/89 X |

Primary Examiner—John Rivell
Attorney, Agent, or Firm—Thomas W. Speckman

[57] ABSTRACT

A reelable flow stopper for plugging fluid flow within a pipe having a guide housing with an enclosed guide channel. A guide housing sealably secures to at least one side of a full port gate valve and the opposite side of the full port gate valve is in communication with the inside of the pipe. The pipe has an access hole in a pipe wall of the pipe. The guide channel is in communication with the access hole. At least one guide prong of a fork extends into the pipe. The guide prong is secured to the guide housing. A roller bearing is rotably mounted to each guide prong of the fork. A take-up spool is secured to the bearing and the take-up spool rotates with respect to each guide prong of the fork. A stopper tape has a spool end secured to the take-up spool and an opposite end contacting the guide pins located within the guide housing. The guide pins route and guide the stopper tape into and out of the pipe. A crank is secured to a crank gear. A drive gear is secured with respect to the take-up spool. A chain is connected around the crank gear and the drive gear. Rotating the crank rotates the take-up spool and either coils or uncoils the stopper tape about the take-up spool located within the pipe.

24 Claims, 2 Drawing Sheets

REELABLE FLOW STOPPER FOR PLUGGING FLUID FLOW WITHIN A PIPE

BACKGROUND OF THE INVENTION

1. Field of the Invention

A reelable flow stopper for plugging fluid flow within a pipe, the flow stopper feeds a stopper tape through a hole in a pipe wall and forms a coiled or wound stopper tape which acts as a plug by spanning the inside diameter of a pipe.

2. Description of the Prior Art

Utility services, particularly gas utilities, often require a device which can be inserted into any main or branch pipeline in a distribution system, temporarily stopping the flow of gas in such main or branch pipeline following a procedure commonly known as a "no-blow" or "hot-tap" operation. Heavy construction and earth-moving equipment can damage or rupture a gas main and thereby create an urgent need to quickly and safely stop the gas flow. Existing rapid flow shutdown devices or line stopping equipment do not combine access through a small hole having a diameter approximately equal to 25 percent of the nominal diameter of a pipe, with reusability and sufficient mass and density to work in medium to high pressure systems.

Rapid flow shutdown systems using inflatable cartridges or bladders can be inserted through a relatively small access hole. However, such rapid flow shutdown systems operate successfully only in lower pressure systems, those operating at pressures less than approximately 5 psig, not medium or high pressure systems, those operating at pressures up to approximately 120 psig. A bladder or cartridge small enough to fit into an access hole having a diameter equal to approximately 25 percent of the nominal pipe diameter requires stretching the elastomeric bladder or cartridge beyond safe limits to attain a proper seal. Thus failures of such rapid flow shutdown system due to creep or cold flow can happen rather quickly. A catastrophic failure of the bladder or cartridge would result in almost full fluid flow since the bladder or cartridge has relatively little mass and great volume. Thus in a failed situation, a bladder or cartridge does not impede fluid flow but rather creates a potentially hazardous situation to a working crew at or near a repair trench, the public and property. A flow stopper according to this invention has significantly greater mass than that of a bladder or cartridge flow stopper. Even in a failed situation, because of its mass a flow stopper according to this invention can still substantially reduce the fluid flow in a pipe.

McGowan et al, U.S. Pat. No. 4,295,494 teaches a method and apparatus for plugging and cutting an underground pipeline without any need for excavating to obtain access to the point of plugging. A thermally stabilized cross-linked preshrunk polyolefin plug is inserted into a pipeline from a point where the pipeline exits the earth. The plug is inserted on the end of a heater element, the heater element heats the plug and causes the plug to expand and fit tightly inside the pipeline at or near the main pipeline. Once the plug is expanded into a tight fit, the heater element can be withdrawn from the pipeline. The teachings of the U.S. Pat. No. 4,295,494 reduce the cost of plugging a pipeline since the preshrunk polyolefin plug can be inserted into the pipeline from the point where the pipeline exits the earth and requires no excavating, backfilling and/or repaving.

Garmong, U.S. Pat. No. 4,441,561 teaches a method and apparatus for locating, isolating and treating a section of a formation within a well bore. The formation is isolated within the well bore by using radially expandable packer elements of a straddle packer assembly which are independently expanded and contracted with the application of positive expanding and contracting forces. Such expanding and contracting forces are applied using remotely located controls above ground. The expanding and contracting forces are used to open a partially closed area of a well bore.

Shonrock et al, U.S. Pat. No. 4,554,973 teaches a method and apparatus for sealing a well casing. The U.S. Pat. No. 4,554,973 describes a method for sealing a length of well casing to prevent fluid disposed therein from flowing upwardly into another length of well casing.

Harrison, U.S. Pat. No. 4,607,469 teaches a method and apparatus for sealing tubular conduits carrying utility lines which do not totally displace the void within the tubular conduit. A plurality of dams are spaced within the conduit along the axis of the conduit. A silicone or RTV rubber is injected into a cell and the silicone or RTV rubber is exposed to enough moisture to cure the resin.

Yie et al, U.S. Pat. No. 4,458,721 teaches a pipeline flow restrictor having a plurality of restrictor arms extending from one or both ends of a flow restrictor cartridge. The ends of the restrictor arms, located opposite from the ends of the restrictor arms attached to the flow restrictor cartridge, restrict the inflation of an inflatable sleeve. The inflatable sleeve can be pressurized to fluid pressures greater than the pressure within the pipeline. An inflatable sleeve having restrictor arms according to the U.S. Pat. No. 4,458,721 can restrict flow in pipelines having pressures of up to approximately 125 psig. The U.S. Pat. No. 4,458,721 further discloses a combination boring-insertion tool which utilizes fluid pressure to provide force for the hole cutter.

SUMMARY OF THE INVENTION

It is an object of this invention to provide a reelable flow stopper that sealably plugs fluid flow within a pipe.

It is another object of this invention to provide a reelable flow stopper which can be inserted into a pipe through an access hole having a diameter less than approximately 25 percent of the nominal diameter of the pipe, thus lowering the cost of the flow stopper system and making such repair more time efficient. The relatively small diameter access hole also satisfies a requirement for cast iron pipe where relatively larger openings are unacceptable for reasons obvious to a person skilled in the art.

It is yet another object of this invention to provide a reelable flow stopper tape which can be would to within millimeters of an inside wall of the pipe thus requiring a relatively slight expansion of a topper tape to produce a proper seal.

It is yet another object of this invention to provide a reelable flow stopper which is installed in a pipe at low torque or force levels compared to the forces exerted by solid rubber plugs, steel wedge stoppers, etc. Such feature of this invention allows the reelable flow stopper to be used in plastic or polyethylene pipes, such as gas distribution pipes, as well as cast iron or steel pipes.

It is yet another object of this invention to provide a reelable flow stopper which substantially plugs or stops flow even in the event of a failure in the flow stopper.

It is yet another object of this invention to provide a reelable flow stopper which accommodates a wide range of pipe inside diameters simply by constructing the guide prongs on a movable center and adjusting the lengths of guide prongs and the length of the stopper tape which winds upon a take-up spool.

In a preferred embodiment of this invention, a reelable flow stopper for plugging flow within a pipe has a guide housing having an enclosed guide channel. The guide housing is sealably secured to a full port gate valve which is sealably secured to an outside wall of the pipe. The pipe has a pipe through hole located in a pipe wall of the pipe. The pipe through hole is in communication with the guide channel.

A guide housing and full port gate valve is sealably secured to the outside wall of the pipe by using a hot-tap. The hot-tap operation includes cutting a hole into the pipe wall by using the "no-blow" method. A drilling machine is sealably attached to the gate valve, the cut is made, and the pipe wall coupon and the drilling machine are removed leaving the gate valve which is capable of closing the piping system. The flow stopper assembly is then sealably secured to an end of the gate valve opposite the guide housing. When the flow stopper assembly and gate valve are removed, the guide housing is sealed with a plug which may be screwed and backwelded.

The flow stopper has a fork with at least one guide prong secured to the guide housing. Each guide prong of the fork extends into the pipe and substantially spans the inside diameter of the pipe. A bearing is secured to a mid-portion of the guide prong. The bearing may be movable to accommodate different pipe wall thicknesses. A take-up spool is secured to the bearing and the take-up spool rotates with respect to the guide prong.

The guide housing has at least one guide pin mounted between the inner housing walls of the guide housing. Each guide pin can rotate with respect to the guide housing and can also slide into position in the center of the pipe. The guide pins are used to route and guide the stopper tape into and out of the pipe.

The stopper tape coils and uncoils about the take-up spool located within the pipe. A crank is secured to a crank gear. A drive gear is secured with respect to the take-up spool. A chain connects around the crank gear and the drive gear. Rotating the crank rotates the take-up spool and either coils or uncoils the stopper tape about the take-up spool located within the pipe.

In one embodiment according to this invention, the guide housing of the flow stopper can be sealably secured to an outside wall of the pipe at an access hole having a diameter less than approximately 15 to 40 percent, preferably less than approximately 25 percent, of the nominal diameter of the pipe. In another embodiment, the guide housing can also be sealably secured to one end of a full port gate valve which has an opposite end sealably secured to the pipe access hole. In a preferred embodiment of this invention, the fork has two guide prongs and a bearing is rotably mounted between the two guide prongs. The bearing can be a roller bearing sealed to prevent fluid flow across the axis of rotation of the bearing from an upstream side to a downstream side of the bearing.

The stopper tape can be a metal tape with or without an elastomeric coating. The thickness of the elastomeric coating can vary along the length of the stopper tape, for example, the coating thickness can be greater near the end of the tape to provide a better seal at the inside pipe wall, particularly if the wall is relatively rough. The stopper tape can also be made from a flexible material or a material that is both flexible and inflatable. The stopper tape can also have interlocking ridges and grooves for forming a seal within the stopper tape in a wound position and for providing structural stability of the coiled stopper tape. Grease or another suitable material can be injected into the pipe at the upstream side of the coiled tape to improve the seal.

The flow stopper may have a bladder which surrounds the flow stopper within the pipe. The bladder can form a tight seal between a coiled stopper tape and the inside wall of the pipe. The bladder can be made from an elastomeric material. The flow stopper can have an inflatable enclosure positioned within the pipe on an upstream side of the flow stopper. In such embodiment, the inflatable enclosure sealably abuts the flow stopper and an inside wall of the pipe. The inflatable enclosure can be made from an elastomeric material, or any other suitable material known to the art.

DESCRIPTION OF THE PREFERRED EMBODIMENTS

Figure 1:
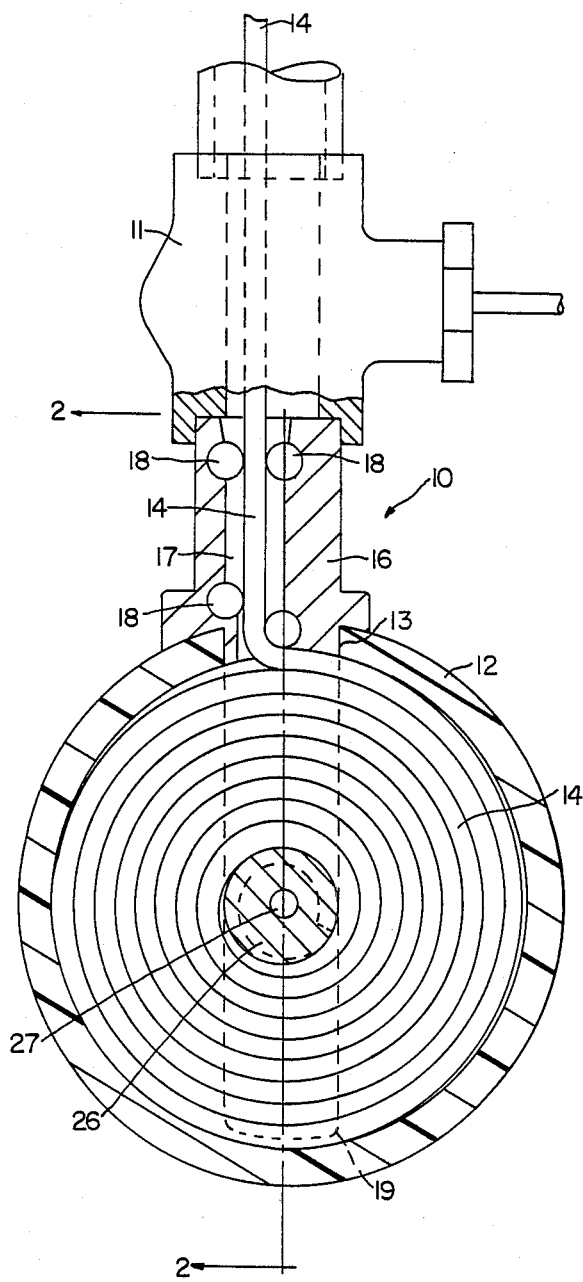
FIG. 1 shows a partial cross-sectional end view of a reelable flow stopper and a valve according to one embodiment of this invention.

FIG. 1 shows a partial cross-sectional end view of reelable flow stopper 10 for plugging fluid flow within pipe 12 according to one embodiment of this invention. Pipe 12 has access hole 13 located near the top section of pipe 12, as shown in FIG. 1. Access hole 13 can be located at any position on pipe 12. Guide housing 16 is sealably secured to one end of valve 11 which has an opposite end that is sealably secured to pipe 12. As shown in FIG. 1, valve 11 has lower guide housing 16 secured around access hole 13 forming a sealed connection with pipe 12. It is apparent that several methods exist for sealably securing guide housing 16, valve 11 and pipe 12, such as screwed connections, welded connections, friction fitting connections, or any other suitable connection known to the art.

Valve 11 is a necessary member of this invention when using flow stopper 10 with a "hot-tap" connection, a connection made to a pipe while the pipe is operating under pressure, without causing leaks. Guide housing 16 can be sealably secured between pipe 12 and valve 11 as shown in FIG. 1. Guide housing 16 can also be sealably secured to valve 11 with the opposite side of valve 11 being sealably secured to a pipe nipple which is sealably secured to pipe 12. Valve 11 can be sealably secured between two guide housings 16 with one of the two guide housings 16 sealably secured to pipe 12. When a "hot-tap" connection is required, a full port valve, preferably a gate valve, is used to sealably insert a drill bit through valve 11 and drill a hole in the pipe wall. Once the hole has been bored, the drill bit is removed and valve 11 is closed. Thus no fluid escapes. If a "hot-tap" procedure is not necessary, guide housing 16 can sealably secure directly to access hole 13 of pipe 12.

Depending upon the particular fluid service working within pipe 12, guide housing 16 may or may not require a fluid-tight connection with pipe 12. In a preferred embodiment of this invention, guide housing 16 encases guide channel 17. Guide channel 17 is in communication with access hole 13 and/or the inside of pipe 12. Guide pins 18 are mounted within guide channel 17 of guide housing 16. Guide pins 18 can either be non-rotably mounted within guide channel 17 or rotatably mounted with respect to guide housing 16.

Figure 2:
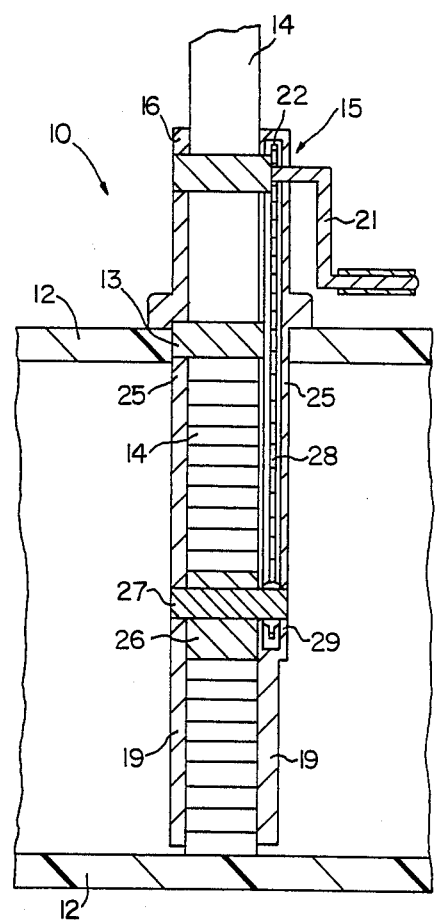
FIG. 2 shows a partial cross-sectional front view along line 2—2 of a reelable flow stopper without the valve as shown in FIG. 1.

Fork 25 has at least one guide prong 19 secured to guide housing 16. Guide prong 19 of fork 25 secured to guide housing 16 preferably by guide prong 19 being a one-piece extension of guide housing 16, or by having guide prong 19 connected to guide housing 16 with screws, by welding guide prong 19 to guide housing 16, or by any other suitable connecting method known to the art. FIGS. 1 and 2 show fork 25 having two guide prongs 19 which extend substantially across the inside diameter of pipe 12. It is apparent that the guide prongs 19 of fork 25 can have any shape, preferably a plate-like shape, as long as guide prong 19 of fork 25 aligns stopper tape 14 in a tight coil as shown in FIG. 2.

In a preferred embodiment of this invention, roller bearing 27 is mounted between two guide prongs 19 or fork 25. Guide prongs 19 of fork 25 and roller bearing 27 are movable within pipe 12 such that the centerline axis of roller bearing 27 aligns with the centerline axis of pipe 12. Take-up spool 26 is secured to roller bearing 27. Take-up spool 26 rotates with respect to guide prong 19 of fork 25 or with respect to pipe 12. Stopper tape 14 has a spool end secured to take-up spool 26 and an opposite end located outside of guide channel 17.

Stopper tape 14 is fed into guide channel 17 between guide pins 18 and into pipe 12. As a longer length of stopper tape 14 is fed into pipe 12, stopper tape 14 forms a tight coil. Guide prong 19 of fork 25 keeps stopper tape 14 aligned while being coiled thereby forming a plug within pipe 12. FIG. 1 shows a distorted and enlarged thickness of stopper tape 14 for purposes of illustration. Stopper tape 14 actually has a proportional thickness of much less than that depicted in FIG. 1. Stopper tape 14 actually is thin enough to eliminate all voids at the point where one section of stopper tape 14 overlaps another section of stopper tape 14 located at the entrance of access hole 13.

Figure 5:
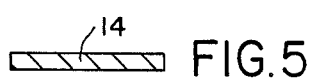
FIG. 5 shows a cross-sectional side view of a metal stopper tape according to one embodiment of this invention.
Figure 6:
FIG. 6 shows a cross-sectional side view of a metal stopper tape coated with an elastomeric material according to one embodiment of this invention.

Various designs of stopper tape 14 can be coiled within pipe 12 depending upon the operating conditions of the fluid contained in pipe 12. FIG. 5 shows a cross-sectional view of a steel or other suitable metal stopper tape 14. FIG. 6 shows a cross-sectional view of a steel or other suitable metal stopper tape 14 coated with an elastomeric material. Such elastomeric material compresses forming a tight seal between each layer of stopper tape 14 and between stopper tape 14 and the inside wall of pipe 12. The thickness of the elastomeric coating can vary along the length of the stopper tape, primarily near the end of the tape for providing a better seal.

Figure 8:
FIG. 8 shows a cross-sectional side view of an inflatable stopper tape according to one embodiment of this invention.
Figure 9:
FIG. 9 shows a cross-sectional side view of an interlocking stopper tape having a plurality of ridges and grooves according to one embodiment of this invention.
Figure 7:
FIG. 7 shows a cross-sectional side view of a metal stopper tape having an interlocking ridge and groove according to one embodiment of this invention.
Figure 10:
FIG. 10 shows a cross-sectional side view of a stopper tape having interlocking rounded ridges and grooves according to another embodiment of this invention.

FIG. 7 shows a cross-sectional view of a suitable metal stopper tape 14 having an interlocking ridge and groove which forms a sealed connection between layers of stopper tape 14. FIG. 8 shows a cross-sectional view of stopper tape 14 constructed of a flexible and inflatable material. Such flexible and inflatable material can be wound into a relatively loose coil than inflated to form a tightly sealed coil. FIGS. 9 and 10 show cross-sectional views of a suitable metal stopper tape 14 having interlocking corrugations on both the top and bottom surfaces of stopper tape 14. Such corrugations interlock forming a tight seal between each layer of a coiled stopper tape 14 and between stopper tape 14 and take-up spool 26 and the inside wall of pipe 12. It is apparent that other cross-sectional shapes and other materials known to the art can be used to accomplish a tight seal between take-up spool 26, stopper tape 14 and the inside wall of pipe 12.

FIG. 2 shows coiling mechanism 15 located within the upper portion of guide housing 16, according to one embodiment of this invention. Crank 21 secures to crank gear 22. Crank gear 22 is rotably mounted with respect to guide housing 15. In a preferred embodiment of this invention, crank 21 and one guide pin 18 are one piece, crank gear 22 is secured to one end of guide pin 18, and guide pin 18 is rotably mounted with respect to guide housing 16. It is apparent that other methods can be used to accomplish the rotation of crank gear 22 with respect to guide housing 16. However, in the preferred embodiment described above, rotating guide pin 18 creates contact between guide pin 18 and stopper tape 14 and such contact helps feed stopper tape 14 within pipe 12.

Drive gear 29 is secured to take-up spool 26. Drive gear 29 and take-up spool 26 rotate together with respect to guide housing 16. Chain 28 extends around crank gear 22 and drive gear 29. Rotating crank 21 or crank gear 22 engages drive gear 29 and thus rotates take-up spool 26 within pipe 12. Depending on the directional rotation of crank 21 or crank gear 22, stopper tape 14 either coils or uncoils about take-up spool 26. It is apparent that other methods can be used to rotate take-up spool 26 within pipe 12, such as a belt drive system, an automatically operated crank gear 22 assembly, or any other suitable method known to the art.

Depending upon the fluid service within pipe 12, stopper tape 14 and guide pins 18 may or may not form a seal within guide channel 17. Guide channel 17 can be sealed by providing a tight contact between guide pins 18, the inside side walls of guide channel 17 and stopper tape 14. It is apparent that guide channel 17 can be sealed using other methods such as an enlarged guide housing 16 which sealably encloses an entire length of stopper tape 14, or any other suitable sealing method known to the art.

The diameter of access hole 13 varies as function of the width of stopper tape 14. Access hole 13 can have a diameter less than approximately 15-40 percent, preferably less than approximately 25 percent, of the nominal diameter of pipe 12. It is apparent that roller bearing 27 can be replaced by any other suitable bearing known to the art. However, it is an important aspect of this invention that roller bearing 27 or any other type of bearing prevent fluid from flowing through the bearing along the axis of rotation from the upstream side to the downstream side of flow stopper 10.

Figure 4:
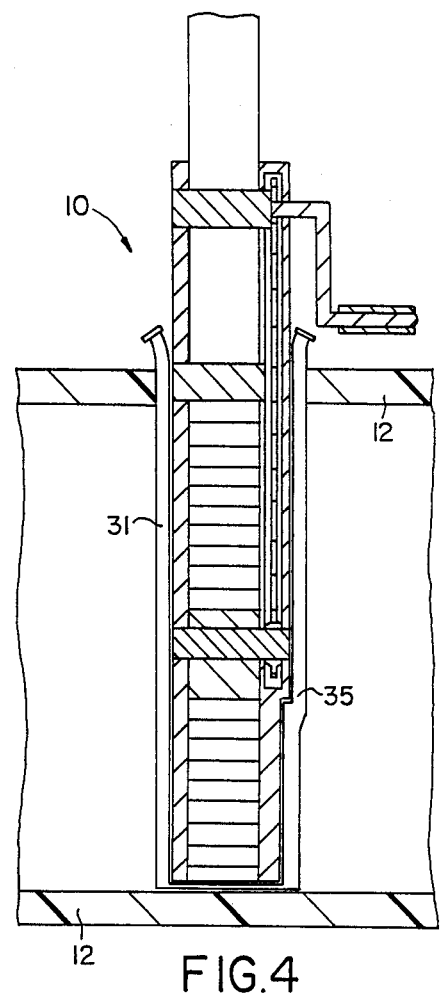
FIG. 4 shows a partial cross-sectional front view of a bladder surrounding a reelable flow stopper according to one embodiment of this invention.

FIG. 4 shows a partial cross-sectional front view of bladder 31, preferably an elastomeric bladder, surrounding flow stopper 10. Bladder 31 fits around flow stopper 10 within pipe 12. As stopper tape 14 coils forming a seal against the inside walls of pipe 12, bladder 31 is tightly positioned between the coiled stopper tape 14 and the inside wall of pipe 12. Bladder 31 can then be inflated to form an even tighter seal within pipe 12.

Figure 3:
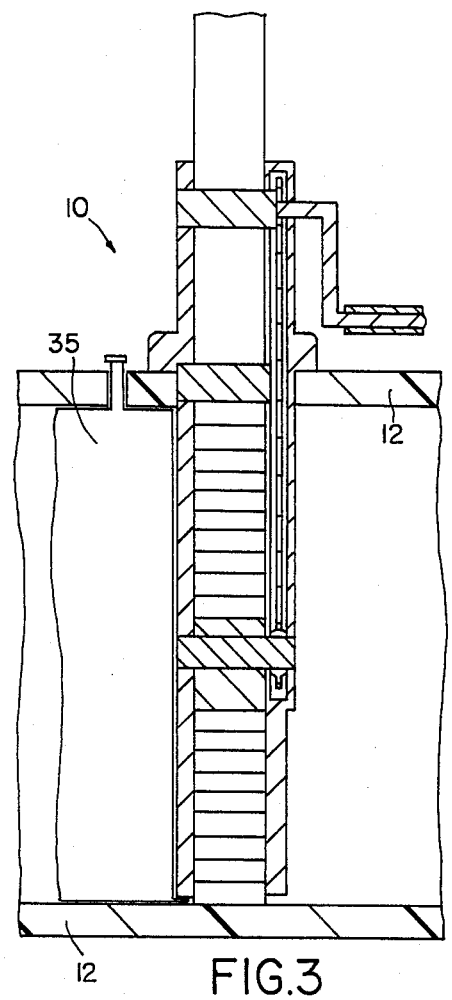
FIG. 3 shows a partial cross-sectional front view of an inflatable enclosure located within a pipe on an upstream side of a reelable flow stopper according to one embodiment of this invention.

FIG. 3 shows a partial cross-sectional front view of an inflatable enclosure positioned within pipe 12 on an upstream side of flow stopper 10. Elastomeric enclosure 35, in its inflated position, abuts flow stopper 10 and forms an additional seal to prevent flow. The upstream pressure within pipe 12 deforms elastomeric enclosure 35 and provides an additional seal.

Unlike other existing inflatable flow stopping devices, a reelable flow stopper according to this invention introduces the wound stopper tape 14, which is a large mass of material, through a relatively small access hole 13. Flow stopper 10 according to this invention has such a large mass of stopper tape 14 fitting within pipe 12 that the large mass will effectively stop the flow in pipe 12. A large mass of stopper tape 14 will result in an inherently safer flow stopper than an inflatable bladder which may unexpectedly burst leaving a small mass of bladder material in the piping system and releasing a sudden flow of fluid down pipe 12.

Existing inflatable bladder designs without restrictor arms are generally safely used in low pressure systems, such as pipes containing a maximum pressure of 30 psi. Existing inflatable bladder or sleeve designs also using restrictor arms, such as that taught by Yie et al, U.S. Pat. No. 4,458,721, can operate in piping systems having pressures of up to about 125 psig. A flow stopper 10 according to this invention can be used in higher pressure systems, such as pipes containing a maximum pressure of approximately 60 psi. Because of the small access hole 13 required to wind stopper tape 14 within pipe 12, the cutting tools and equipment and fittings are as small as or smaller than the cutting tools and equipment and fittings necessary to install an inflatable bladder.

Although a flow stopper 10 according to this invention will impede flow in any type of pipe or pipe, flow stopper 10 particularly operates effectively in gas service piping systems. High pressure gas main pipelines normally have an inside diameter of approximately 6 inches to 12 inches which are the preferred sizes of pipe that accommodate flow stopper 10 according to this invention. Gas distribution pipes or pipes are constructed of flexible materials such as polyethylene pipe or other similar materials. The would coil formed by stopper tape 14 applies radially outward forces to the inside wall of pipe 12 thus forming a tight seal between stopper tape 14 and the inside wall of pipe 12. As the wall of pipe 12 is forced outward, such as a wall of polyethylene pipe, the wall has an opposing inward force which acts against the forces created by an enlarged coil of stopper tape 14. The result is a tight seal between stopper tape 14 and the inside wall of pipe 12 and take-up spool 26.

The flow stoppers 10 can be used to isolate a section of pipe and provide a bypass operation. In such bypass, each flow stopper 10 is surrounded by a housing which is sealably secured to the outside wall of pipe 12. The housings are in communication with each other by a connecting bypass pipe or the like. With such housing surrounding flow stopper 10, crank gear 22 can be a bevel gear and crank 21 can have a mating bevel gear and a stem which extends outward from the housing for easy access.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A reelable flow stopper for plugging fluid flow within a pipe, the flow stopper comprising:

an access hole located in a pipe wall of the pipe, a guide housing having an enclosed guide channel, said guide housing sealably secured to an outside wall of the pipe, said access hole in communication with said guide channel;

a fork having at least one guide prong secured to said guide housing, said at least one guide prong of said fork extending into the pipe;

bearing means rotably mounted to said at least one guide prong, a take-up spool, a stopper tape, said take-up spool secured to said bearing means and movable within the pipe for centering said take-up spool with respect to the pipe, said take-up spool rotable with respect to said at least one guide prong;

said stopper tape having a spool end secured to said take-up spool and an opposite free end located outside of said guide channel, each said guide pin contacting and guiding said stopper tape into and out of the pipe; and drive means for coiling and uncoiling said stopper tape about said take-up spool within the pipe.

2. A flow stopper according to claim 1 wherein said access hole has a diameter less than approximately 15 percent to approximately 40 percent of a nominal diameter of the pipe.

3. A flow stopper according to claim 2 wherein said access hole has a diameter less than approximately 25 percent of said nominal diameter of the pipe.

4. A flow stopper according to claim 1 wherein said fork has two guide prongs and said bearing means is rotably mounted between said two guide prongs.

5. A flow stopper according to claim 1 wherein said bearing means further comprises a roller bearing sealed to prevent fluid flow across an axis of rotation of said bearing from an upstream side to a downstream side of said flow stopper.

6. A flow stopper according to claim 1 wherein said drive means further comprises: a crank, a crank gear, said cranks secured to said crank gear, a drive gear secured with respect to said take-up spool, a chain, said chain connected around said crank gear and said drive gear, and rotating said crank rotates said take-up spool.

7. A flow stopper according to claim 1 wherein said feed means further comprises at least one guide pin mounted between inner housing walls of said guide housing.

8. A flow stopper according to claim 7 wherein said guide pins rotate with respect to said guide housing.

9. A flow stopper according to claim 1 wherein said stopper tape further comprises a flexible material.

10. A flow stopper according to claim 9 wherein said stopper tape is inflatable.

11. A flow stopper according to claim 1 wherein said stopper tape is a metal tape having an elastomeric coating.

12. A flow stopper according to claim 1 wherein said stopper tape has interlocking means for forming a seal within said stopper tape in a wound position.

13. A flow stopper according to claim 1 wherein said at least one guide prong of said fork substantially spans an inside diameter of the pipe.

14. A flow stopper according to claim 1 further comprising: a bladder, said bladder surrounding the flow stopper within the pipe and said bladder forming a seal between said access hole and said guide housing.

15. A flow stopper according to claim 14 wherein said bladder further comprises an elastomeric material.

16. A flow stopper according to claim 1 further comprising an inflatable enclosure positioned within the pipe on an upstream side of the flow stopper and said inflatable enclosure sealably abutting said flow stopper and an inside wall of the pipe.

17. A flow stopper according to claim 16 wherein said inflatable enclosure further comprises an elastomeric material.

18. A flow stopper according to claim 1 wherein said guide housing has a sealed enclosure encasing said stopper tape when said stopper tape is not coiled about said take-up spool.

19. A flow stopper according to claim 1 further comprising fluidic sealing means injected in the pipe at the upstream side of the flow stopper for sealing voids around and within said stopper tape in a coiled position.

20. A flow stopper according to claim 19 wherein said fluidic sealing means is grease.

21. A flow stopper according to claim 1 wherein forces are exerted by said coiled stopper tape against inner walls of the pipe and magnitudes of said forces are low enough to be tolerated by plastic pipe.

22. A flow stopper according to claim 1 wherein said plastic pipe is of polyethylene.

23. A flow stopper according to claim 1 wherein the pipe is of steel.

24. A flow stopper according to claim 1 wherein the pipe is of cast iron.

* * * * *